April 6, 1954

E. J. HOUDRY 2,674,521

CATALYTIC CONVERTER FOR EXHAUST GASES

Filed May 5, 1950

INVENTOR.
EUGENE J. HOUDRY
BY
*Busser and Harding*
ATTORNEYS.

April 6, 1954

E. J. HOUDRY 2,674,521

CATALYTIC CONVERTER FOR EXHAUST GASES

Filed May 5, 1950

INVENTOR.
EUGENE J. HOUDRY
BY
Busser and Harding

ATTORNEYS.

April 6, 1954

E. J. HOUDRY 2,674,521

CATALYTIC CONVERTER FOR EXHAUST GASES

Filed May 5, 1950

INVENTOR.
EUGENE J. HOUDRY
BY
Busser and Harding
ATTORNEYS.

April 6, 1954
E. J. HOUDRY
2,674,521
CATALYTIC CONVERTER FOR EXHAUST GASES
Filed May 5, 1950
4 Sheets-Sheet 4

INVENTOR.
EUGENE J. HOUDRY
BY
Busser and Harding
ATTORNEYS.

Patented Apr. 6, 1954

2,674,521

UNITED STATES PATENT OFFICE 2,674,521

CATALYTIC CONVERTER FOR EXHAUST GASES

Eugene J. Houdry, Ardmore, Pa., assignor to Oxy-Catalyst, Inc., a corporation of Pennsylvania Application May 5, 1950, Serial No. 160,180

5 Claims. (Cl. 23—288)

Under running conditions of internal combustion engines of the spark ignition type, the exhaust gases contain large amounts of poisons and obnoxious fumes. Automobile spark ignition engines run on air-fuel mixtures varying from lean to rich, according to speed and traffic conditions. When the engine runs on lean mixture, the amount of oxidizable material contained in the exhaust gas is small, but when the engine performs in traffic conditions and mostly on rich mixture, the amount of oxidizable material is great. In urban locations, especially where traffic is dense, which necessitates frequent stoppages, the carbon monoxide, a deadly poison, contained in the exhaust gas of an automobile averages 4.5 per cent. by volume and at certain times reaches 9.0 per cent., the average automobile under these conditions releasing to the atmosphere approximately six pounds per hour of carbon monoxide. As small an amount as 0.1 per cent. of carbon monoxide is dangerous to life, while mere traces of carbon monoxide in the air cause disagreeable and injurious physical conditions, such as headache and dizziness. In addition to poisonous, odorless carbon monoxide, exhaust gases from gasoline powered engines have an extremely disagreeable odor when the engine is running idle or during deceleration. This odor results from the formation of aldehydes, acids and incompletely burned fuel.

In order to render these obnoxious and dangerous fumes harmless, and particularly to convert the carbon monoxide to carbon dioxide or otherwise eliminate it, many expedients have been proposed and patented, including the use of catalysts. When first considered, the problem seems simple. This is because a great number of catalysts can be used for the reaction. By simply placing one of these catalysts in the exhaust line under controlled conditions, the exhaust fumes can be cleaned, but due to various defects none has shown possibilities of successful commercialization. None of the heretofore proposed catalytic processes provides adequately for the inconstancy of the factors incident to the reaction, in which throughput, chemical composition and temperature of the stream vary constantly over a wide range.

Throughput varies from one to 20.

Carbon monoxide content in the exhaust gases varies from 9.0 to 0.4 per cent., hydrogen varies from 4.0 per cent. to traces; there are encountered also other changes due to excess lubrication, failure of spark plugs, worn piston rings, and to drivers using the engine as a brake while switching off the ignition.

Temperatures of exhaust gas streams at the end of the engine exhaust manifold in commercial cars are on the average about as follows:

| | °F. |
|---|---|
| Engine idle | 450 |
| 30 M. P. H. | 770 |
| 40 M. P. H. | 880 |
| 50 M. P. H. | 1100 |

To solve this problem economically and simply, it is preferred to bring the catalyst to oxidation temperature by the exhaust gases when starting the engine.

For quick starting, it is obvious that catalyst should be close to the exhaust manifold end.

When engines run idle combustion efficiency corresponds very often to an air-fuel ratio of 11:1 and the incomplete combustion of the air-fuel mixture under these conditions leaves some 7.8 per cent. carbon monoxide and 3.4 per cent. hydrogen in the exhaust gas. The oxidation of such percentages of carbon monoxide and hydrogen liberates enough B. t. u. to raise the temperature of the exhaust gases by 1800° F.

If it be assumed that a car is progressing on the highway at a speed of 45 miles per hour, the temperature of the catalyst installed near the exhaust manifold end is close to the temperature of the exhaust gases plus added fresh air (for there is little to oxidize) and is of the order of 900° F.–1000° F. When such a car stops suddenly at a red light, with motor idling, temperatures of exhaust gases plus added fresh air fall rapidly, but heat in the catalyst and in the steel supporting it plays an important role. In fact, I have obtained under certain conditions temperature as high as 2200° F. Such temperature will destroy or greatly impair the activity of many oxidation catalysts and create a problem of the steel structure.

The problems presented by such widely variant conditions are serious. It is apparent that the catalyst has to be controlled and temperature limits determined. There being no constant factor in the reaction, it became clear to me that only a "starting point" corresponding to critical conditions of reaction and operation would permit a practical solution. This point corresponds to the largest amount of oxidizable products contained in the exhaust gases, and in all cases has been found above but close to idle range of the engine.

Another problem that has baffled solution is that of the catalytic structure and composition. So far as previously used catalysts have been efficient, their efficiency is of limited duration.

For example, when using metal grid supports for the catalyst, they rapidly distort and corrode on account of excessive variations of high temperatures. Further, the active catalyst coated on the metal separates from the grid and falls in the catalytic container or is carried away by the exhaust gases.

When using material in granular or pellet form, the attrition, due to the vibration and shocks which make the pellets roll over one another, entails a large consumption of catalyst. Also breakage of the pellets or of the containers occurs due to the extremely variable temperature of the catalytic mass, which causes expansion and contraction of the container.

In tests made on modern cars, using a single catalytic mass composed of pellets, the oxidizable components of the exhaust gas were completely removed, but at the outlet of the catalytic mass temperatures in excess of 2000° F. were obtained at frequent intervals. This temperature was found too high for commercial catalyst life and good mechanical behavior of the catalytic exhaust system. In the apparatus used the catalyst container was placed at an angle and a small reservoir containing extra catalyst was placed on top of the catalyst container so that the extra catalyst would flow by gravity and keep the container filled. It was found that the losses after each stopping and consequent cooling down of the engine were consistent, the average being 1.07 cubic inches of catalyst. This would require that the catalyst in pellet form would have to be replaced every week for average driving of passenger cars.

In an application filed by me August 9, 1949, Serial No. 109,288, as well as in an earlier application filed by me May 24, 1949, Serial No. 95,031, I have disclosed catalytic units, hereafter described, that are open to none of the objections applicable to those theretofore proposed and that I have found satisfactory both as to operativeness and long life. In the later of these two applications I have referred to the desirability, especially in engines of large size, of arranging the catalytic units in parallel. Such a construction is the subject-matter of this application.

Preferred embodiments of the invention are shown in the drawings, in which—

The embodiment of the invention shown in Fig. 1 will first be described. The catalytic apparatus is placed immediately at the end of the exhaust manifold. It comprises an annular flange $a$ having an opening $b$ for escape of exhaust gases; a pipe $c$ extending beyond, and in alignment with, the exhaust gas opening $b$ and closed at its end; a pipe $d$ (to which are secured the catalytic units hereinafter described) surrounding the pipe $c$ and also closed at its end; and a cylindrical chamber $e$ surrounding and enclosing both pipes. Spaced between the annular flange $a$ and another annular flange $f$ (to which the pipes $c$ and $d$ and the chamber $e$ are secured) is a web $g$ having holes $h$ for admission of atmospheric air to the space between the gas exhaust and the fluid admission end of pipe $c$ to provide a gas-air mixture feed to pipe $c$. Within this space an air filter $r$ may be inserted. Within pipe $c$, adjacent to its gas-air admission end, is a venturi $i$.

Figure 2:
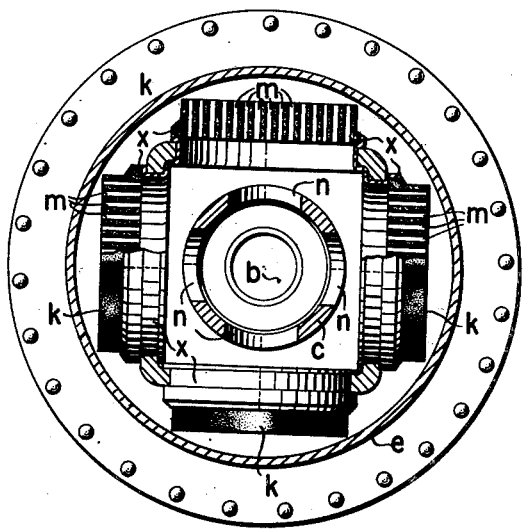
Fig. 2 is a cross-section on the line 2—2 of Fig. 1.
Figure 3:
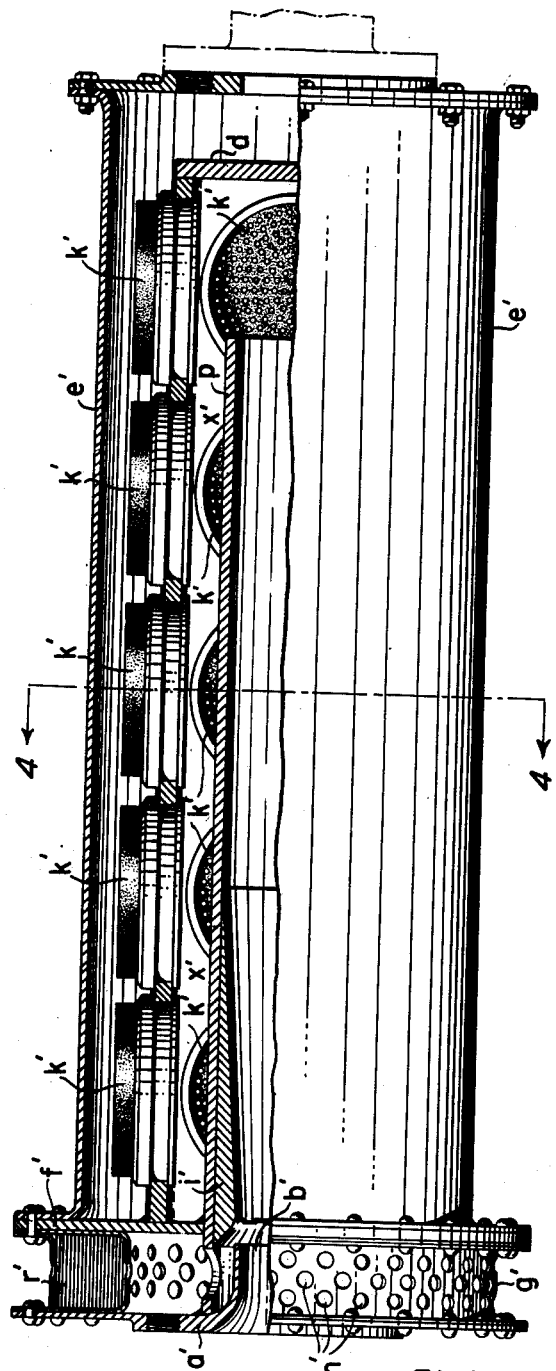
Fig. 3 is a horizontal sectional view of another embodiment.

Pipe $d$ is provided in its circumferential wall with a number of openings within which are crimped or welded metal holders $x$. Carried by the holders $x$ are catalytic units $k$, which may be of the type described in my said copending application Serial No. 95,031, filed May 24, 1949. For example, each unit may comprise a supporting disc $k$ of porcelain, having holes $m$ extending therethrough from face to face, the walls of the holes having deposited thereon a base film of active alumina having distributed thereon a finely divided metal catalyst. The thickness of the catalytically active base and the size of the metal particles are too small to permit illustration. While the specific construction of the catalyst is not an essential feature of the invention, catalysts selected at random of the prior art cannot be assumed to be operative. The catalyst should comprise a support $k$ that is chemically inert under operating conditions, such as porcelain. The catalytically active base should be an active stable oxide, preferably alumina, although magnesia, beryllia or thoria are examples of permissible substitutes, and should preferably be in the form of a firmly adherent film, deposited on the support, of a weight and thickness quite small as compared with the weight and thickness of the support. Such a film, particularly when made according to the process set forth in the application of Louis E. Malina filed April 21, 1950, Serial No. 157,413, now United States Patent No. 2,580,806, issued January 1, 1952, having a minimum thickness of about .001" and a maximum thickness of from .006" to .015", gives a remarkable activity to the oxidation catalyst of finely divided metal with which the film is subsequently impregnated, as well as a long life to the catalyst. The deposited finely divided metal catalyst is preferably platinum, although it is practicable to substitute ruthenium, palladium, or iridium, or silver or silver-chromium, or copper, copper-chromium or copper-manganese. Several different specific constructions of such catalysts are shown in my said application filed May 24, 1949, Serial No. 95,031, one of which is illustrated in Figs. 1, 2 and 3 and has been hereinbefore described.

The present application deals especially with engines of large size, using catalytic units in parallel. With such a disposition of the catalytic units pressure drop through the catalytic elements can be made extremely low, and consequently percentage of fresh air admission through venturi can be large and between 50 and 100 per cent of the weight of the exhaust gases.

By proper selection of, first, the length of the flow passages through the elements of the catalytic units; second, of the surface of those elements which radiate heat on the envelope surrounding those catalytic elements, and third, of the percentage of fresh air admitted through the venturi, it has been found that the temperature of the catalyst can be maintained below 1500° F. and easily kept in the range of 1200–1300° F. if desired.

Pipes c and d are maintained at temperatures below 950° F. by the incoming gases and loss of heat by radiation through the envelope e surrounded by atmospheric air. The metal supports x are so dimensioned that by heat exchange with pipe d the temperature exceeds only slightly the temperature of pipe d.

Pipe c is provided in its circumferential wall with holes n aligning with the several catalytic units k.

The air-exhaust gas mixture entering pipe c flows through the holes n and thence through the aligning catalytic units k. The passage of the air-exhaust gas mixture through these units will reduce all the carbon monoxide to carbon dioxide, as well as eliminate all sickening odors from aldehydes, acids and unburned fuel, under all conditions of operation. While it would be simple to install one single catalytic unit in the form of, for instance, a perforated porcelain cylinder having a catalytic surface equal to those of the aforesaid elements, with the same length of flow passage, it is impracticable to build a single porcelain support of a size adequate to take care of a large volume of air-exhaust gases mixture, with a surface large enough to exchange heat by radiation to the envelope, and of a proper length of flow. But by flowing such mixture in parallel through a cinsiderable number of separate units—sixteen are disclosed in Fig. 1—the requisite purification of the gases, before release to the atmosphere, is effected.

Figure 1:
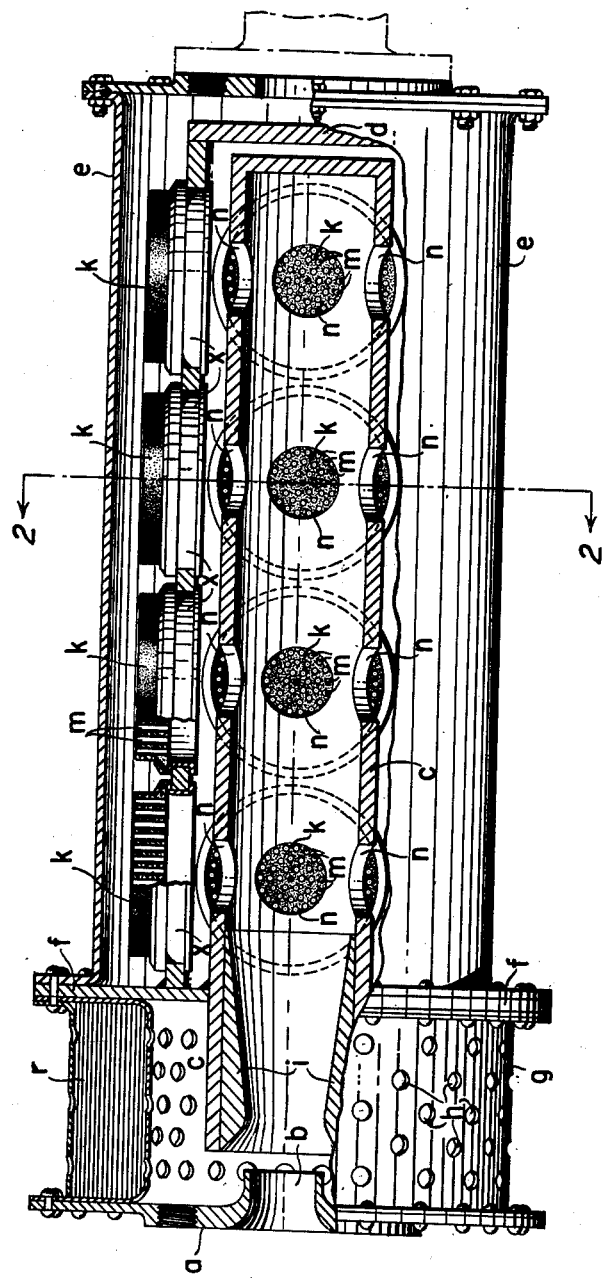
Fig. 1 is a horizontal sectional view of one embodiment.
Figure 4:
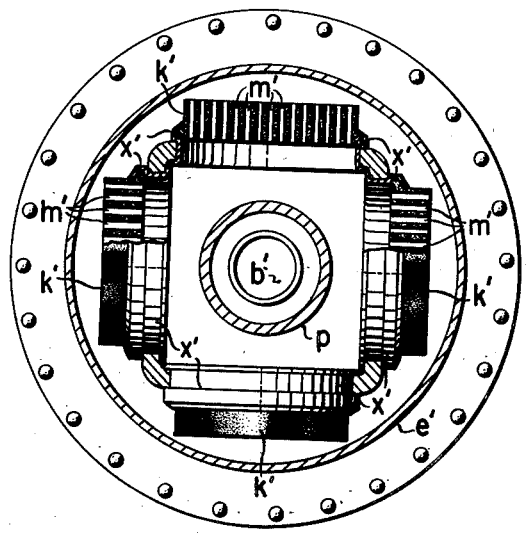
Fig. 4 is a cross-section on the line 4—4 of Fig. 3.

In principle, the construction shown in Fig. 3 does not differ from that shown in Fig. 1. In Fig. 3 the wall of internal pipe p is imperforate, and is open at the far end and all the air-exhaust gas mixture flows throughout the length of the pipe p and thence into the surrounding pipe d', which corresponds to the pipe d of Fig. 1 and in the wall of which are mounted the catalyst units k' which may be of the same construction as the units k shown in Fig. 1. In Fig. 3 the letters a', b', e', f', g', h', r' and i' correspond respectively to the elements a, b, e, f, g, h, r and i of Fig. 1.

For the purpose of clarity, the above description has been limited to gasoline powered engines of the spark ignition type. The present invention applies equally to diesel engines, notwithstanding the following different characteristics of the exhaust gases of that type of engine as compared to gasoline powered engines.

Contrary to gasoline powered engines, which run on air-fuel mixtures varying from rich to lean, diesel engines run on mixtures which vary from very lean to lean. The amount of oxidizable material contained in diesel exhaust gases is generally small, except in the case of medium size, high speed diesel engines operating at or near full fuel injection. Whatever the quantity, diesel powered vehicles release to the atmosphere carbon monoxide, aldehydes, acids, incompletely burned fuel, and tarry materials which are highly objectionable.

Diesel engines present also inconsistency of factors incident to the reaction.

Throughput of exhaust gases varies according to speed, from approximately 1.0 to 5.0.

Carbon monoxide varies from traces at idling conditions, up to 1.5 per cent. at high speed.

Other objectionable materials are found in all conditions. There is an excess of oxygen in the exhaust gases and consequently venturi need not be used, or if used, additional fresh air may be kept at much lower percentage than in the case of gasoline powered engines.

Temperature of exhaust gases stream varies from about 250° F. at idling conditions up to about 1300° F. at full load in the case of high speed diesel engines. In the case of large size, low speed diesel engines, temperature of exhaust gases varies generally from about 250° F. up to about 850° F.

In comparison to gasoline powered engines, combustion efficiency in diesel engines is good, even excellent, with air-fuel ratio above theoretical for complete combustion, and of the order of 20:1 and above at all conditions of R. P. M. and load.

At the most, the oxidation of burnable materials contained in the exhaust gases from diesel engines under normal conditions will raise the temperature of the exhaust gases by only about 250°. Consequently, keeping the catalyst temperature below 1500° F. is not a problem. It is usually neither necessary nor advisable, in the case of diesel engines, to provide a series of catalytic sections each comprising a certain number of catalytic units with cooling of the gases between sections, as explained in my said application Serial No. 109,288, it being practicable in the case of medium size diesel engines to secure excellent results by disposing the catalytic unit in a single section placed as near as possible to the exhaust manifold end. For diesel engines of large size, it is preferable, however, to use a large number of catalytic units in parallel, as previously described in this application. Obviously it is also practicable to insert the catalytic units between the cylinder and the manifold itself, so that the output of fumes from each cylinder (or group of cylinders) is clean before entering the manifold.

When diesels run idle, their exhaust gases have a very disagreeable odor due to small amounts of aldehydes, acids, etc., but there is practically no carbon monoxide content, and there is not enough heat produced by oxidation to maintain the catalyst at reaction temperature.

If it be assumed that a diesel truck is progressing on the highway under normal load, the temperature of the catalyst is usually between 1000 and 1100° F. When such a truck stops suddenly at a red light with motor idling, temperature of exhaust gases and catalyst falls rapidly. We have found that the heat stored in the catalyst and in the steel supporting it, permits maintaining the reaction for approximately five minutes, during which there is no odor released to the atmosphere. After this time has elapsed, the temperature of the catalyst is approximately 550° F., it continues to be cooled by the exhaust gases, temperature of which is then about 250° F., and the odor becomes noticeable. If it is desirable to maintain the reaction and clean the fumes for a longer period, it is necessary to spray fuel in the exhaust fumes. Such an amount of fuel is small and corresponds to the number of B. t. u.'s necessary to raise the temperature of the exhaust gases to the starting temperature of the catalytic oxidation (550–600° F.).

In the case of diesel engines it is important to keep the pressure drop in the exhaust very low. Diesel engine manufacturers insist on this condition before approving any system having for object to clean the exhaust fumes. Hence the interest in using catalytic units in parallel as described in the present application.

The catalytic units must be fixedly mounted so that each unit is independent of the other in order that the catalytic surface of a unit is never in contact with the catalytic surface of another unit. Those units should be so arranged that they are never in compact relationship, and so designed that the pressure drop can be kept low, as shown in the present application.

In diesel engines, the danger of excessive temperatures exists solely when the engine runs under load, that is, at or near full fuel injection. We have seen that after oxidation, and assuming that there would be no loss by radiation, the maximum temperature of the catalyst could reach 1550° F., which is some 250° above maximum temperature of the exhaust gases before oxidation (1300° F.). The addition of 10 to 20 per cent of fresh air through a Venturi system, plus radiation losses, will suffice to keep the maximum catalyst temperature at 1200° F., which will permit the catalyst to maintain its activity for a long period.

Figure 5:
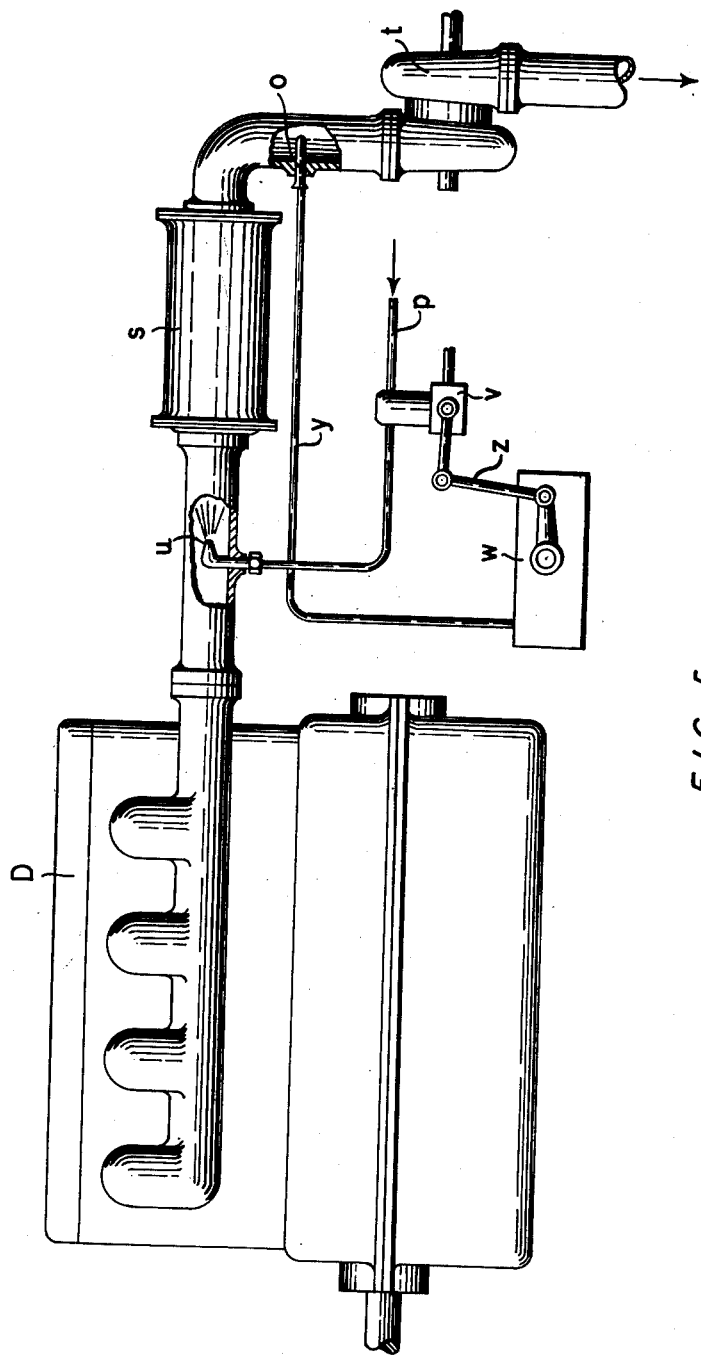
Fig. 5 is a diagrammatic view showing the adaptation of my invention to the use of the catalytically purified exhaust gases to the driving of a turbine.

While the purified exhaust gases may be discharged directly into the atmosphere, I have discovered that it is practicable to utilize them to more effectively recover a greater part of the energy contained therein than has heretofore been considered practicable. The heat produced in completing the combustion of internal combustion engines of all types, plus the heat contained in the exhaust gases, is at times greater than the heat used in the engine for available power. Ways and means to recover a great part of the energy contained in exhaust gases are numerous. Thus exhaust gases have been discharged to waste heat boilers, or at a pressure slightly above atmosphere into turbines. The exhaust gas purifier herein described provides a simple and safe means to recover all the heat contained in the unburned fraction of the exhaust gas. Illustrative of this use reference may be made to Fig. 5, in which D represents a turbo charging engine of the diesel type, from which exhaust gases under pressure, after passing through a catalyst device $s$ of the character of that hereinbefore described, are discharged into a turbine $t$ for actuating a compressor, generator or other apparatus. The temperature of the exhaust gases in most cases of diesel supercharge is below the temperature permissible for turbine blades. There is usually enough oxygen contained in the exhaust gases to permit increase of the temperature thereof to the maximum permissible for the turbine blades, as of the order of 1150° F. The necessary quantities of fuel to maintain a desired or predetermined temperature can be fed into the stream of exhaust gases in advance of the catalyst device $s$ by a suitable injector $u$ at the end of a pipe $p$ containing liquid or gaseous fuel under pressure, injector $u$ serving to atomize or spray such admitted fuel into intimate mixture with the exhaust gases for subsequent oxidation and temperature increase as the gases traverse catalyst device $s$. Automatic control of the feeding of fuel through injector $u$ is effected in any known or suitable manner in response to temperature changes in the gases leaving catalytic device $s$. In the arrangement disclosed a thermocouple $o$ is mounted in the connection between catalyst device $s$ and turbine $t$ to actuate through connection $y$ mechanism in control box $w$ which in turn through linkage $z$ changes the setting of a valve device $v$ to open, change or stop the flow of fuel through pipe $p$ to injector $u$. This automatic arrangement gives control of the temperature of the gases going to turbine $t$ within about 100° F., as in the range of 1050° to 1150° F. A number of instrument makers furnish control devices and equipment of the general type indicated at $o$, $w$ and $v$, and detailed description of their structure and operation is unnecessary.

What is claimed is:

1. The combination, with the exhaust of an internal combustion engine, a chamber communicating therewith having an opening for escape of purified gases, and an inner pipe connected with the exhaust and extending lengthwise within the chamber, of a second pipe surrounding the inner pipe and means affording communication between the inner pipe and the annular space between the two pipes, the second pipe having a multiplicity of openings in its peripheral wall, and catalytic units within and extending across said openings, said openings being so nearly contiguous one to another that the greater part of the entire peripheral area of the second pipe is occupied by the catalyst units.

2. The combination defined in claim 1 in which said communicating means comprise exhaust gas escape openings in the inner pipe in radial alignment with said catalytic units.

3. The combination defined in claim 1 in which the inner pipe is open at the end thereof opposite its exhaust gas receiving end to provide such communicating means.

4. The combination defined in claim 1 comprising also an enclosed web surrounding the exit of the engine exhaust having openings for admission of atmospheric air and a venturi within the inlet end of the inner pipe.

5. The combination defined in claim 1 in which the inner pipe is of cylindrical shape while the outer pipe is of polygonal shape, the catalyst units being of a width approximating the width of the sides of the polygon.

References Cited in the file of this patent

UNITED STATES PATENTS

| Number | Name | Date |
|---|---|---|
| 1,766,945 | Riehm | June 24, 1930 |
| 1,940,700 | Riehm | Dec. 26, 1933 |
| 2,447,124 | Kalitinsky et al. | Aug. 17, 1948 |

FOREIGN PATENTS

| Number | Country | Date |
|---|---|---|
| 413,967 | Great Britain | July 26, 1934 |